March 15, 1966 J. K. MILLS 3,241,044
THYRATRON TUBE REPLACEMENT UNITS EMPLOYING CONTROLLED
RECTIFIERS AND A CONTROL TRANSISTOR
Filed Dec. 22, 1961 2 Sheets-Sheet 1

INVENTOR
J. K. MILLS
BY R. B. Anderson
ATTORNEY

March 15, 1966 J. K. MILLS 3,241,044
THYRATRON TUBE REPLACEMENT UNITS EMPLOYING CONTROLLED
RECTIFIERS AND A CONTROL TRANSISTOR
Filed Dec. 22, 1961 2 Sheets-Sheet 2

INVENTOR
J. K. MILLS
BY R. B. Ardis
ATTORNEY

United States Patent Office 3,241,044

Patented Mar. 15, 1966

3,241,044
THYRATRON TUBE REPLACEMENT UNITS EMPLOYING CONTROLLED RECTIFIERS AND A CONTROL TRANSISTOR

John K. Mills, Morristown, N.J., assignor to Bell Telephone Laboratories, Incorporated, New York, N.Y., a corporation of New York Filed Dec. 22, 1961, Ser. No. 161,553
1 Claim. (Cl. 323—22)

This invention relates to electron tube replacement units and more particularly to solid-state thyratron tube replacement units.

The prior art is abundant in high power supplies wherein thyratrons are used as control elements. The enormous amounts of power handled by the thyratrons results in a relatively short tube life span which, in turn, leads to considerable idle equipment time, replacement, and maintenance costs. The annual cost of such maintenance in a telephone system where much of the equipment is at remote unattended location is staggering. Thus, it is desirable to replace the thyratron tube in existing locations as well as in new applications with reliable, long-life, solid-state units.

Although the solid-state pnpn device (controlled rectifier as described, for example, in the paper, "A Silicon Controlled Rectifier—Its Characteristics and Rating—I," D. K. Bisson and R. F. Dyer, paper 58–1248, American Institute of Electrical Engineers) is generally referred to as a solid-state thyratron, attempts to substitute controlled rectifier directly for thyratrons have not been successful. The major obstacle appears to be that the gate current required to cause breakover at a specified voltage in a controlled rectifier is relatively large and variable when compared to the breakdown grid voltage and current of a comparable thyratron. It should be noted that although in making the comparison of thyratrons to controlled rectifiers, the analogy of the thyratron breakdown voltage to the controlled rectifier breakover voltage is commonly used, this appears to be somewhat fallacious, since the breakover voltage of the controlled rectifier is very sensitive to temperature and varies widely from device to device. An additional problem arises in that the maximum inverse voltage of a controlled rectifier is somewhat less than that of a comparable thyratron tube.

It is, therefore, an object of this invention to provide a solid-state thyratron tube replacement unit to reduce the idle equipment time, replacement, and maintenance costs of equipments utilizing thyratron tubes.

In accordance with this object it has been found that it is possible to replace the thyratron tubes in all equipments with a universal solid-state unit. Such a unit, however, achieves its universality only at the expense of excess components for any given application. In order to avoid this surplusage and the inherent extra cost, two solid-state units are preferred: one to be used whenever the thyratron is phase-controlled by the external circuitry and the other when the thyratron is magnitude-controlled by the external circuitry. In phase-controlled circuitry, the phase difference of an alternating-current input signal and an alternating-current reference signal control the thyratron breakdown whereas in magnitude-controlled circuitry the breakdown is controlled by a direct-current voltage which varies over a smaller range for control. This application relates to the solid-state, magnitude-controlled thyratron unit. A copending application of P. W. Clarke, Serial No. 161,551, assigned to the same assignee and filed concurrently with this application, discloses the solid-state, phase-controlled thyratron replacement unit. It has been found that these solid-state units increase the over-all efficiency of the associated circuitry.

Magnitude-controlled operation is possible with thyratron tubes because the breakdown voltage is a function of both the grid and the plate voltage. The firing angle, i.e., the time delay between the point where the alternating-current input signal crosses the zero axis and the point at which the tube fires, may be delayed by varying the grid bias over a small range. This simple method is usually used without grid bias amplification since the gate breakdown requirements of thyratrons are relatively small and constant. The large and variable gate breakover current requirements of controlled rectifiers noted heretofore, however, has thwarted attempts of direct substitution of controlled rectifiers for thyratrons.

Briefly, the present invention employs an amplifying element between the control signal and the circuit interrupter means (controlled rectifier). The amplification thus obtained makes it possible to fire the controlled rectifier at small values of control voltage. A feedback loop automatically adjusts the exact breakover voltage required to maintain equilibrium at the regulated output. In addition to replacing the thyratron tubes in existing half wave circuitry on a direct substitution basis, the present invention may also be extended to full wave circuitry on a new application basis. Overcurrent "droop" protection is easily added to both the half and full wave configurations.

Other objects and features of the present invention will become apparent upon consideration of the following detailed description when taken in connection with the accompanying drawings in which.

It should be noted that the first digit of each component in each of the figures of the drawings corresponds to the figure-number wherein that component made its first appearance.

Figure 1:
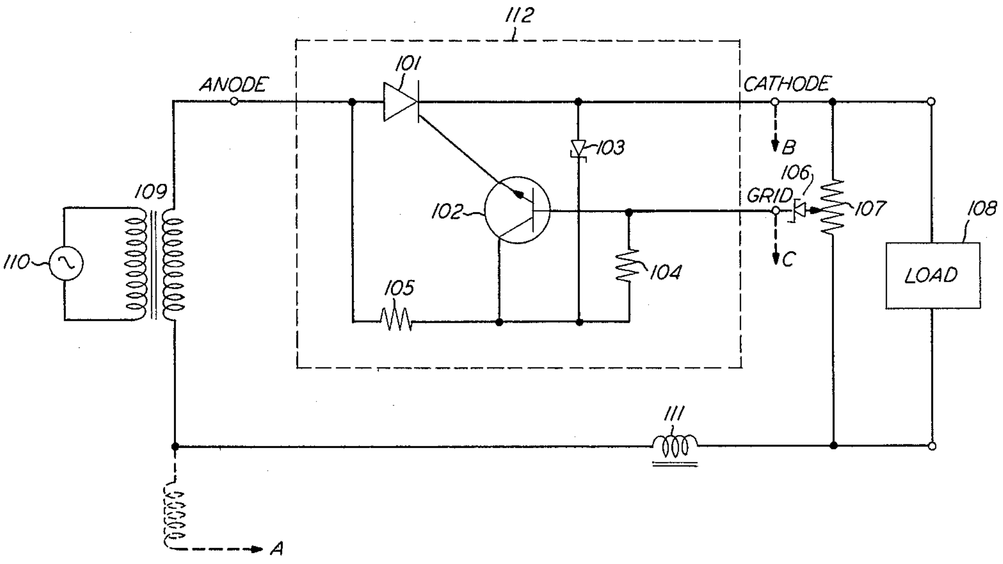
FIG. 1 is a half wave, magnitude-controlled circuit wherein a solid-state thyratron replacement unit is employed.

FIG. 1 of the drawings illustrates one form which the thyratron replacement unit for magnitude-controlled circuitry, as shown in the dotted box 112, may take. The anode, cathode, and grid terminal notations of FIG. 1 refer to the corresponding thyratron tube terminals. In the embodiment of the invention shown in FIG. 1, controlled rectifier 101 has its anode terminal connected to the corresponding tube anode terminal while its cathode terminal is connected to the corresponding tube cathode terminal. The emitter of amplifying transistor 102 is connected to the gate lead of controlled rectifier 101. The anode electrode of controlled rectifier 101 is connected to the collector electrode of transistor 102 by resistor 105. The cathode electrode of controlled rectifier 101 is connected to the collector electrode of transistor 102 by Zener asymmetrically conducting device 103. The base and collector electrodes of transistor 102 are connected by resistor 104. The base electrode of transistor 102 is connected to the slider of potentiometer 107 by Zener asymmetrically conducting device 106. The secondary of transformer 109 is serially connected with the anode and cathode terminals of controlled rectifier 101, the load 108, and the filter choke 111. Alternating-current source 110 is connected to the primary of transformer 109.

The operation of the circuit of FIG. 1 is as follows: Depending upon the direct-current load voltage, the base of transistor 102 is biased either positive or negative with respect to the cathode terminal. When the base of transistor 102 is positive with respect to the cathode terminal, the transistor is biased into conduction causing base-emitter, hence collector-emitter current flow. The collector-emitter current provides gate current for controlled rectifier 101 and causes breakover at some low forward voltage. The inherent amplification of the transistor 102 thus allows the controlled rectifier 101 to be biased into conduction at relatively small values of base-emitter current, thus overcoming the major obstacle in substituting controlled rectifiers for thyratron tubes, as noted heretofore. The exact breakover voltage required to maintain equilibrium at the regulated output is automatically adjusted by the feedback loop which comprises Zener asymmetrically conducting device 106, the base-emitter electrodes of transistor 102, the gate cathode electrodes of controlled rectifier 101, and a portion of the potentiometer 107, as shall be discussed hereinafter. When the base-emitter path of transistor 102 is too negative, i.e., the potential appearing at the base of transistor 102 is negative with respect to the cathode terminal, no gate current flows and the controlled rectifier 101 is prevented from firing. This would occur if the output voltage were too high, e.g., during the transient following removal of a portion of the load. It should be noted that the invention requires the use of the inherent gain of the transistor, the function of which is not, therefore, merely that of a switch.

The Zener asymmetrically conducting device 103 and resistor 105 of FIG. 1 provide the quiescent bias for the transistor 102. A Zener asymmetrically conducting device 103 is used both to clamp the collector voltage of transistor 102 to a stable value of bias voltage and to limit the inverse voltage appearing across the collector-emitter electrodes of transistor 102 when controlled rectifier 101 is "turned off" (by a large inverse voltage). If a Zener asymmetrically conducing device 103 were not used, i.e., a resistor inserted in its place, the collector-emitter inverse voltage rating of transistor 102 would have to be in the order of magnitude of the controlled rectifier inverse voltage rating. For most power supply applications, this would require a specially manufactured transistor. With the usage of Zener asymmetrically conducting device 103, however, commercially available transistors with sufficient gain may be used. The use of Zener asymmetrically conducting device 103, therefore, results in a considerable saving. Zener asymmetrically conducting device 106 provides a constant reference potential (sometimes referred to as the "grid battery" which is used to control the firing angle) in the base path of transistor 102. Resistor 104 is necessary to provide the sustaining current for Zener asymmetrically conducting device 106 independently of the states of conduction of transistor 102 and the controlled rectifier 101. Resistor 104 also provides the base drive for transistor 102. Resistor 105 provides a sustaining path for Zener asymmetrically conducting device 103 which is also independent of the the state of conduction of transistor 102. Until controlled rectifier 101 is biased into conduction by the collector-emitter current flow through transistor 102, therefore, all the current through resistor 104 flows through Zener asymmetrically conducting device 106, a portion of potentiometer 107 and the filter choke 111. The current through resistor 105 divides between resistor 104 and Zener asymmetrically conducting device 103. When controlled rectifier 101 is biased into conduction, the current in resistor 104 divides between the Zener asymmetrically conducting device 106 and the base-emitter current path of transistor 102 which, in turn, determines the gate current of controlled rectifier 101. The gate current is supplied from the current flow through resistor 105 which is now divided between the collector-emitter current flow through transistor 102 and the current flow through resistor 104 and Zener asymmetrically conducting device 103. The potentiometer 107 provides for selective sampling of the output potential which appears across load 108. Inductor 111 is a filter choke.

The embodiment of the invention of FIG. 1 is a magnitude-controlled circuit of the half-wave type. Such a circuit may be converted to full wave by using a center-tapped secondary on transformer 109, as shown by the dotted portions of the drawing, and connecting the anode terminal of a second thyratron unit, identical to the one enclosed by the dotted box 112, to the point A noted on FIG. 1. The cathode terminal of the second unit 112 would be connected to point B while the grid terminal would be connected to point C.

Figure 2:
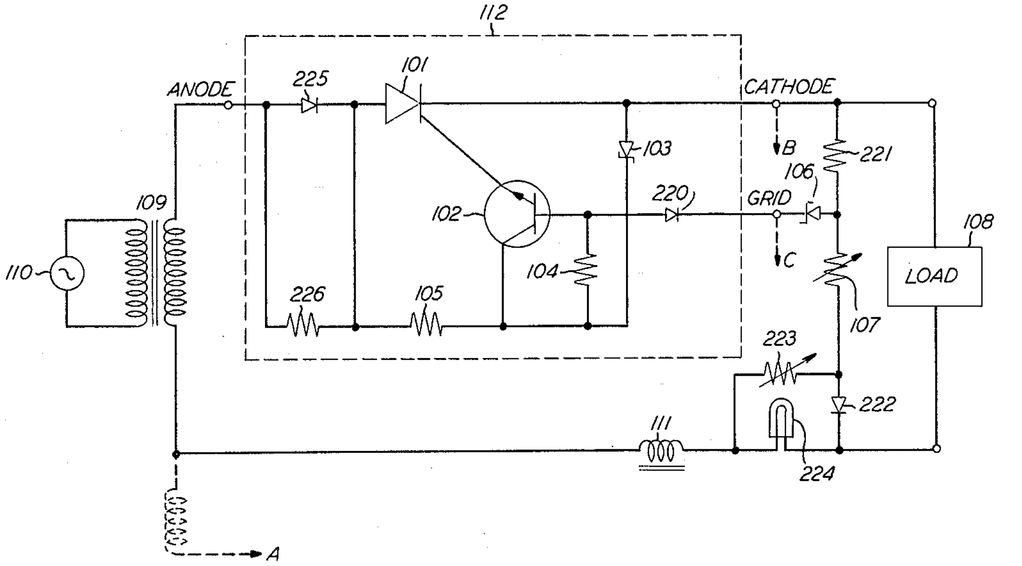
FIG. 2 is a second embodiment of a half wave, magnitude-controlled circuit wherein a second embodiment of a solid-state thyratron replacement unit is employed.

FIG. 2 of the drawings illustrates a second embodiment of a solid-state thyratron replacement unit for magnitude-controlled circuitry. The operation of the circuit of FIG. 2 is substantially the same as the operation of the circuit of FIG. 1 and is, therefore, not discussed further at this time. Asymmetrically conducting device 225 is added in series with controlled rectifier 101 to share the inverse voltages appearing across controlled rectifier 101 for applications where excessive inverse voltages are inherent. The resistor 226 in combination with resistor 105 "forces" this inverse voltage sharing. Asymmetrically conducting device 220 is a blocking device which is necessary in a full wave configuration (as shown in the dotted portions of the drawing as discussed in connection with FIG. 1) to prevent a "sneak" sustaining path through the base-emitter path of the "turning off" thyratron replacement unit when the other thyratron replacement unit is "turning on." Ballast lamp 224, resistor 223, and asymmetrically conducting device 222 provide circuit "droop" control, i.e., when the load current reaches a predetermined maximum value the regulation changes from constant voltage to constant current and the load voltage is reduced progressively to prevent overloading the equipment. At load currents below the preset "droop" value, device 222 and resistor 223 are both conducting and share the current flowing through resistor 107. So long as device 222 is conducting the system maintains constant voltage regulation across load 108. At the "droop" point the lamp potential drop becomes sufficient for the entire current through resistor 107 to pass through resistor 223 causing device 222 to become nonconducting. At this point or for larger loads, the regulator acts to maintain a constant voltage across the load 108 and the lamp 224 in series. The load voltage, however, is reduced by the drop in the lamp 224, whose nonlinear resistance characteristic is such as to limit the output current through the load to an approximately constant value.

Figure 3:
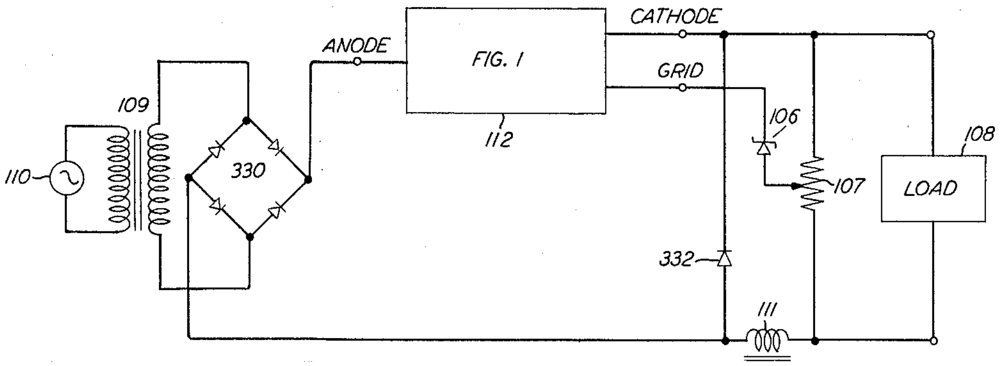
FIG. 3 is an example of a full wave application of FIGS. 1 and 2 wherein certain protection techniques are employed.

The embodiment of the invention illustrated in FIG. 3 is a magnitude-controlled regulator circuit of the full wave type which employs only one thyratron replacement unit 112. The operation of thyratron replacement unit 112 is discussed in connection with FIG. 1 and is not, therefore, discussed further at this time. A full wave bridge rectifier 330 is connected to the secondary winding of transformer 109. Asymmetrically conducting device 332 is a flyback device. The operation of the flyback device is easily seen when the condition existing at the time the thyratron unit is "turning off" is considered. As the current ceases to flow through the thyratron unit, the energy stored in the filter inductor 111 inherently attempts to sustain current flow in the same direction. If flyback asymmetrically conducting device 332 were not provided "sneak" current paths through the diodes of bridge rectifier 330 would allow this energy to tend to introduce a voltage in series with the voltage appearing across the secondary winding of transformer 109 which, in turn, prevents the thyratron unit 112 from turning off despite the fact that the polarity of the alternating-current voltage appearing across the secondary of transformer 109 reverses. The system thus fails to regulate. The addition of flyback asymmetrically conducting device 332, however, provides a discharge path through the load for the energy stored in inductor 111 thereby permitting the thyratron replacement unit to turn off each time the source voltage reverses. There is a related advantage in that the asymmetrically conducting device 332 also reduces the average current through the thyratron replacement unit.

Figure 4:
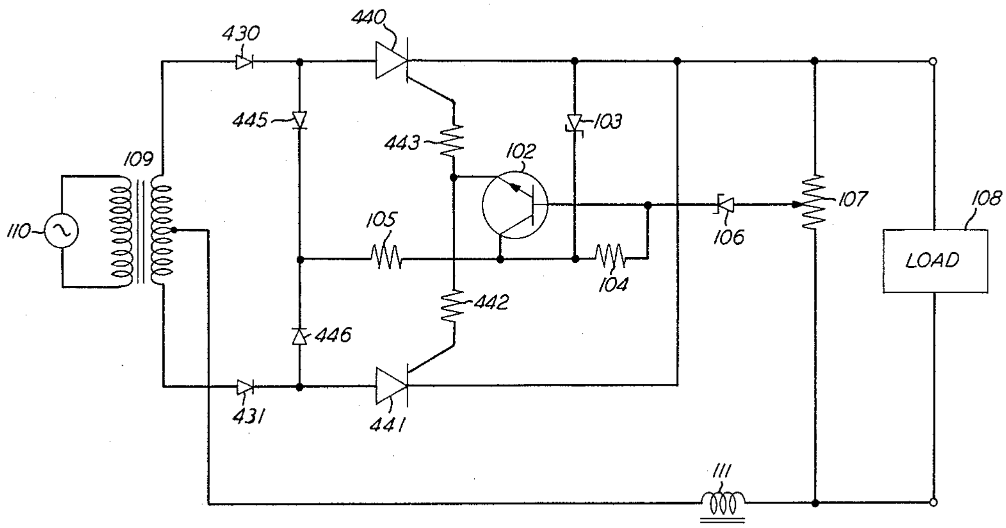
FIG. 4 is a second full wave embodiment wherein a solid-state thyratron unit is employed.

The embodiment of the invention illustrated in FIG. 4 of the drawings is a full wave, magnitude-controlled regulator circuit. The basic operation of the circuit of FIG. 4 is the same as the operation of the circuit of FIG. 1 and is, therefore, not discussed further at this time. Asymmetrically conducting devices 430 and 431 serve as blocking devices. Asymmetrically conducting devices 445 and 446 are used to provide proper bias for the quiescent biasing circuit comprising Zener asymmetrically conducting devices 103 and resistor 105. Resistors 442 and 443 insure equal gate current sharing for the controlled rectifiers 440 and 441 regardless of their individual gate current characteristics. It should be remembered that when considering the operation of the circuit of FIG. 4 that, as discussed heretofore, the firing of the thyratrons in a magnitude-controlled circuit is a function of both the plate and grid voltages which, in turn, makes possible the single control element (transistor) in this configuration.

Since changes may be made in the above discussed arrangements and different embodiments may be devised by those skilled in the art without departing from the scope and spirit of the invention, it is to be understood that the matter contained in the foregoing description and accompanying drawings is illustrative of the application of the principles of the invention and is not to be construed in a limiting sense.

What is claimed is:

A semiconductor thyratron tube replacement unit which comprises an anode terminal, a cathode terminal, and a grid terminal, a semiconductor controlled rectifier having its own anode, cathode, and gate electrodes, means connecting said anode terminal to the anode electrode of said controlled rectifier, means connecting said cathode terminal to the cathode electrode of said controlled rectifier, and substantially linear current amplifying means comprising a first resistor, an npn transistor having its emitter electrode connected to the gate electrode of said controlled rectifier, its collector electrode connected through said first resistor to the anode electrode of said controlled rectifier, and its base electrode connected to said grid terminal, a second resistor interconnecting the base and collector electrodes of said transistor, and a Zener diode interconnecting the collector electrode of said transistor and the cathode electrode of said controlled rectifier, said Zener diode being poled to permit reverse current flow in the direction from the collector electrode of said transistor toward the cathode electrode of said controlled rectifier, whereby the control of the state of conduction of said controlled rectifier from said grid terminal is substantially identical to the control of the state of conduction of the replace thyratron tube from its grid electrode.

References Cited by the Examiner

UNITED STATES PATENTS

| | | | |
|---|---|---|---|
| 2,998,547 | 8/1961 | Berman | 315—200 |
| 3,018,432 | 1/1962 | Palmer | 323—22 |
| 3,163,814 | 12/1964 | Todd | 323—22 |

LLOYD McCOLLUM, *Primary Examiner.*